US011996722B2

(12) United States Patent
Zhou

(10) Patent No.: US 11,996,722 B2

(45) Date of Patent: May 28, 2024

(54) ELECTROCHEMICAL APPARATUS, ELECTRICAL APPARATUS, ELECTRIC VEHICLE, AND POWER SUPPLY CONTROL METHOD

(71) Applicant: DONGGUAN POWERAMP TECHNOLOGY LIMITED, Dongguan (CN)

(72) Inventor: Jun Zhou, Dongguan (CN)

(73) Assignee: DONGGUAN POWERAMP TECHNOLOGY LIMITED, Guangdong (CN)

(*) Notice: Subject to any disclaimer, the term of this patent is extended or adjusted under 35 U.S.C. 154(b) by 526 days.

(21) Appl. No.: 17/219,728

(22) Filed: Mar. 31, 2021

(65) Prior Publication Data

US 2021/0408815 A1 Dec. 30, 2021

Related U.S. Application Data

(63) Continuation of application No. PCT/CN2021/078231, filed on Feb. 26, 2021.

(30) Foreign Application Priority Data

Jun. 29, 2020 (CN) ........................ 202010612162.6

(51) Int. Cl.
*H02J 7/00* (2006.01)

(52) U.S. Cl.
CPC .......... *H02J 7/0063* (2013.01); *H02J 7/0029* (2013.01); *H02J 7/0047* (2013.01); *H02J 7/0068* (2013.01)

(58) Field of Classification Search
CPC ...... H02J 7/0063; H02J 7/0029; H02J 7/0047; H02J 7/0068; H02J 2310/48;

(Continued)

(56) References Cited

U.S. PATENT DOCUMENTS 7,079,003 B2 * 7/2006 Furuta .................. H02J 7/0031 337/184

10,847,988 B2 * 11/2020 Shimura .......... H01M 10/0431

(Continued)

FOREIGN PATENT DOCUMENTS

CN 101160686 B 5/2010

CN 104518547 A 4/2015

(Continued)

OTHER PUBLICATIONS

International Search Report, PCT/CN2021/078231, Jun. 1, 2021, 4 pgs.—No English Translation Available—.

(Continued)

*Primary Examiner* — M Baye Diao

(74) *Attorney, Agent, or Firm* — Morgan, Lewis & Bockius LLP

(57) ABSTRACT

An electrochemical apparatus includes a battery group, a main supply loop, a pre-charging circuit, and a control module. The pre-charging circuit includes a first switch and a thermo-sensitive element. The thermo-sensitive element is configured to electrically connect the first switch, and impedance of the thermo-sensitive element increases with a rise in temperature. The first switch is electrically connected to the control module and the main supply loop, the thermo-sensitive element is electrically connected to the first switch, and the control module is configured to control the first switch to close to turn on the pre-charging circuit. When the pre-charging circuit meets a preset condition, the control module controls the first switch to open to turn off the pre-charging circuit. This application further provides an electrical apparatus, an electric vehicle, and a power supply control method for an electrochemical apparatus.

30 Claims, 6 Drawing Sheets

(58) Field of Classification Search
CPC .............. H02J 7/00714; H02J 7/00309; B60L 2270/20; B60L 3/0023; B60L 50/60; Y02E 60/10; H01M 10/425
USPC .......................................................... 320/128
See application file for complete search history.

(56) References Cited

U.S. PATENT DOCUMENTS

| | | | | |
|---|---|---|---|---|
| 2006/0255766 | A1 | 11/2006 | Yoon et al. | |
| 2007/0052461 | A1 * | 3/2007 | Zhang | H02J 7/00309 327/150 |
| 2007/0126405 | A1 * | 6/2007 | Kao | H02J 7/007194 320/150 |
| 2008/0012532 | A1 * | 1/2008 | Denning | H02J 7/00308 361/111 |
| 2009/0130538 | A1 | 5/2009 | Kaita et al. | |
| 2010/0305770 | A1 | 12/2010 | Bhowmik et al. | |
| 2015/0084404 | A1 | 3/2015 | Hashim et al. | |
| 2019/0036373 | A1 | 1/2019 | Shimura | |
| 2019/0302863 | A1 | 10/2019 | Chandra et al. | |

FOREIGN PATENT DOCUMENTS

| | | | | | |
|---|---|---|---|---|---|
| CN | 204406243 | U | * | 6/2015 | G05D 23/24 |
| CN | 103222098 | B | * | 8/2016 | H01M 10/052 |
| CN | 106671803 | A | | 5/2017 | |
| CN | 206231188 | U | * | 6/2017 | B60H 1/00392 |
| CN | 207021726 | U | | 2/2018 | |
| CN | 207098682 | U | | 3/2018 | |
| CN | 109823180 | A | | 5/2019 | |
| CN | 209454592 | U | | 10/2019 | |
| CN | 111799860 | A | | 10/2020 | |
| EP | 1882997 | A1 | * | 1/2008 | H02J 7/0029 |
| EP | 1882284 | B1 | | 7/2011 | |
| EP | 2822132 | A1 | | 1/2015 | |
| JP | 2008-538892 | A | | 11/2008 | |
| JP | 2009038925 | A | | 2/2009 | |
| JP | 2009089535 | A | | 4/2009 | |
| JP | 2011509068 | A | | 3/2011 | |
| JP | 5209122 | B2 | * | 6/2013 | H01M 10/425 |
| JP | 2013-179760 | A | | 9/2013 | |
| JP | 2016-225440 | A | | 12/2016 | |
| JP | 2019-183495 | A | | 10/2019 | |
| WO | WO2006/115349 | A1 | | 11/2006 | |
| WO | WO-2013128700 | A1 | * | 9/2013 | B60L 11/1803 |

OTHER PUBLICATIONS

Office Action, CN202010612162.6, Jul. 7, 2021, 14 pgs.
Examination Report No. 1, AU20211202525, Dec. 15, 2021, 9 pgs.
Mingshen, Dou, Air Conditioning and Refrigeration Technology, Hubei Science and Technology Publishing House, Oct. 2014, pp. 132-133, 3 pgs.
Office Action, CN202010612162.6, Nov. 11, 2022, 76 pgs.
Examination Report, IN202117015369, Oct. 31, 2023, 7 pgs.
Notice of Reasons for Refusal, JP2021-517617, Oct. 4, 2022, 14 pgs.

* cited by examiner

ELECTROCHEMICAL APPARATUS, ELECTRICAL APPARATUS, ELECTRIC VEHICLE, AND POWER SUPPLY CONTROL METHOD

CROSS REFERENCE TO THE RELATED APPLICATIONS

The present application is a continuation application of PCT application No. PCT/CN2021/078231 filed on 26 Feb. 2021, which claims the benefit of priority from the Chinese Patent Application NO. 202010612162.6 filed on 29 Jun. 2020, the disclosure of both of which is hereby incorporated by reference in their entirety.

TECHNICAL FIELD

This application relates to an electrochemical apparatus, an electrical apparatus, an electric vehicle, and a power supply control method for an electrochemical apparatus.

BACKGROUND

Electric vehicle controllers have large capacitors inside. If there is no pre-charging loop, there is often no charge or only a residual voltage on the capacitors when the vehicle is powered on. For example, directly connecting battery power supply to two ends of a capacitor is equivalent to a transient short-circuit, which may damage the battery and other high-voltage devices. Therefore, the function of the pre-charging loop is to avoid the impact of high current during power-on, thereby protecting the battery and high-voltage devices.

In the prior art, a pre-discharging resistor and a control switch are generally used to implement a pre-charging function. However, subjected to overload power for a specific period of time, the pre-discharging resistor heats up severely. When the loop is short-circuited externally, the pre-discharging resistor heats up more severely. To ensure stable operating of the pre-discharging resistor, it is usually necessary to use a high-power resistor, which will take up much space and cannot be installed in the space of a miniaturized battery structure, so its application is very limited. Especially in a case that the control switch fails, the pre-discharging resistor may continue to heat up, which may cause a device to smoke and burn out, or even cause the battery to burn and explode.

SUMMARY

In view of this, it is necessary to provide an electrochemical apparatus, an electrical apparatus, an electric vehicle, and a power supply control method for an electrochemical apparatus, which have advantages such as high integration, low power consumption cost, and high reliability, can prevent safety problems such as battery burning and explosion caused by heating up of a pre-discharging resistor, and can also improve user experience.

An embodiment of this application provides an electrochemical apparatus, configured to supply electricity to an electrical apparatus. The electrochemical apparatus includes a battery group, a main supply loop, a pre-charging circuit, and a control module. The main supply loop is electrically connected to the battery group. The pre-charging circuit includes a first switch and a thermo-sensitive element. The thermo-sensitive element is configured to electrically connect the first switch, and impedance of the thermo-sensitive element increases with a rise in temperature. The first switch is electrically connected to the control module and the main supply loop. The control module is configured to control the main supply loop to turn off. The control module is further configured to control the first switch to close to turn on the pre-charging circuit. When the pre-charging circuit meets a preset condition, the control module controls the first switch to open to turn off the pre-charging circuit.

According to some embodiments of this application, the preset condition includes that a pre-charging current value is greater than a preset threshold.

According to some embodiments of this application, when the first switch fails, the temperature of the thermo-sensitive element continues to rise and the impedance of the thermo-sensitive element increases, and the thermo-sensitive element is configured to limit a pre-charging current.

According to some embodiments of this application, the pre-charging circuit further includes a temperature control switch, the thermo-sensitive element is further connected to the temperature control switch, and the temperature control switch is opened when the temperature control switch detects that the temperature of the thermo-sensitive element is greater than a preset threshold.

According to some embodiments of this application, when the pre-charging circuit does not meet the preset condition, the control module controls the main supply loop to turn on.

According to some embodiments of this application, the preset condition includes that a pre-charging duration is greater than a preset duration.

According to some embodiments of this application, the electrochemical apparatus further includes a current monitoring circuit, where the current monitoring circuit is electrically connected to the pre-charging circuit and the control module to monitor a pre-charging current of the pre-charging circuit, and feed back a monitored pre-charging current value to the control module.

According to some embodiments of this application, the temperature control switch is electrically connected between the thermo-sensitive element and the first switch, and the temperature control switch is disposed close to the thermo-sensitive element and configured to sense the temperature of the thermo-sensitive element.

According to some embodiments of this application, a first terminal of the first switch is electrically connected to the control module, a second terminal of the first switch is electrically connected to the temperature control switch, and the second terminal of the first switch is electrically connected to the current monitoring circuit.

According to some embodiments of this application, the main supply loop includes a second switch and a third switch, where a first terminal of the second switch is electrically connected to the control module, a second terminal of the second switch is electrically connected to a second terminal of the third switch, a third terminal of the second switch is electrically connected to a third terminal of the first switch, a first terminal of the third switch is electrically connected to the control module, and a third terminal of the third switch is electrically connected to a terminal of a load.

According to some embodiments of this application, the electrochemical apparatus further includes a fuse, where a first terminal of the fuse is electrically connected to a positive electrode of the battery group, and a second terminal of the fuse is electrically connected to an input terminal of the main supply loop.

According to some embodiments of this application, the thermo-sensitive element is connected to the first switch in series.

According to some embodiments of this application, the electrochemical apparatus is a battery pack.

An embodiment of this application further provides an electrochemical apparatus, configured to supply electricity to an electrical apparatus. The electrochemical apparatus includes a battery group, a main supply loop, a pre-charging circuit, and a control module.

The main supply loop is electrically connected to the battery group, the pre-charging circuit includes a first switch and a thermo-sensitive element, the thermo-sensitive element is configured to electrically connect the first switch, and impedance of the thermo-sensitive element increases with a rise in temperature.

The first switch is electrically connected to the control module and the main supply loop, and the thermo-sensitive element is electrically connected to the first switch.

According to some embodiments of this application, the thermo-sensitive element is a ceramic positive temperature coefficient thermistor device.

According to some embodiments of this application, the thermo-sensitive element is connected to the first switch in series.

An embodiment of this application further provides a power supply control method for an electrochemical apparatus, including: controlling a first switch to close to turn on a pre-charging circuit including a thermo-sensitive element, and pre-charging an electrical apparatus through the pre-charging circuit, where the thermo-sensitive element is configured to electrically connect the first switch, and impedance of the thermo-sensitive element increases with a rise in temperature; and when the pre-charging circuit meets a preset condition, controlling the first switch to open to turn off the pre-charging circuit.

According to some embodiments of this application, the preset condition includes that a pre-charging current value is greater than a preset threshold.

According to some embodiments of this application, the preset condition includes that a pre-charging duration is greater than a preset duration.

According to some embodiments of this application, the method further includes: when the pre-charging circuit meets the preset condition, controlling the main supply loop to remain in an off state.

According to some embodiments of this application, the method further includes: when the pre-charging circuit does not meet the preset condition, controlling the main supply loop to remain in an on state.

According to some embodiments of this application, the method further includes: when the pre-charging circuit does not meet the preset condition, controlling the first switch to open.

According to some embodiments of this application, the method further includes: when the pre-charging circuit does not meet the preset condition, controlling the first switch to close.

According to some embodiments of this application, when the first switch fails, the temperature of the thermo-sensitive element continues to rise and the impedance of the thermo-sensitive element increases, to limit a pre-charging current.

According to some embodiments of this application, if the temperature of the thermo-sensitive element continues to rise and the impedance of the thermo-sensitive element increases, it is determined that the first switch has failed.

An embodiment of this application further provides an electrical apparatus, where the electrical apparatus is electrically connected to the foregoing electrochemical apparatus, and the electrochemical apparatus is configured to supply electricity to the electrical apparatus.

An embodiment of this application further provides the foregoing electrical apparatus, the electrical apparatus is provided with a load, and an output terminal of a pre-charging circuit is electrically connected to an input terminal of the load.

An embodiment of this application further provides an electric vehicle, where the electric vehicle is electrically connected to the foregoing electrochemical apparatus, and the electrochemical apparatus is configured to supply electricity to the electric vehicle.

According to the electrochemical apparatus, the electrical apparatus, the electric vehicle, and the power supply control method provided in the embodiments of this application, a pre-charging circuit is used to charge a capacitor of an electrical apparatus and supply power to some low power loads, which resolves a problem that the electrical apparatus cannot work normally due to overcurrent protection at the moment of power-on caused when a main loop switch is directly closed. A temperature control switch is connected to a thermo-sensitive element loop in series, and a current monitoring circuit is used to perform multi-control and monitoring of the pre-discharging loop. This enables the pre-charging circuit to supply power to a low-power circuit module in the electrical apparatus without changing the loop connection mode, and prevents safety risks caused by overload of a common purely resistive pre-charging circuit or its failure in controlling a pre-discharging loop.

REFERENCE SIGNS OF MAIN COMPONENTS

Figure 1:
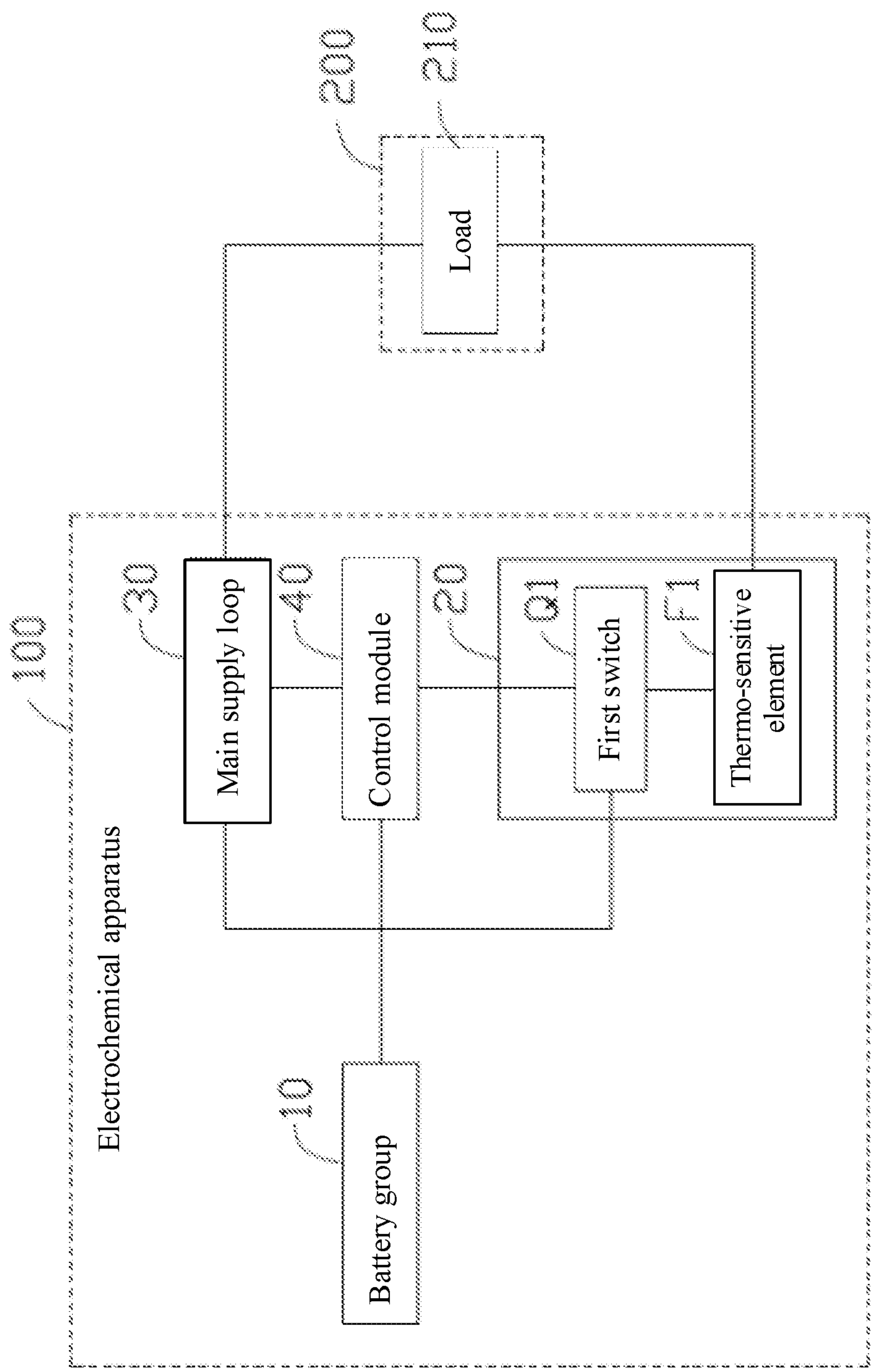
FIG. 1 is a schematic diagram of an electrochemical apparatus according to an embodiment of this application.

Electrochemical apparatus 100
Electrical apparatus 200
Battery group 10
Pre-charging circuit 20
Main supply loop 30
Control module 40
Fuse 50
Current monitoring circuit 60
Load 210
Voltage conversion module 220
First switch Q1
Second switch Q2
Third switch Q3
Fourth switch S1
Fifth switch S2
Sixth switch S3

Thermo-sensitive element F1
Temperature control switch T1
First resistor R1
Second Resistor R2
First capacitor C1
First power element L1
Second power element L2

This application is further described in detail in the following specific embodiments with reference to the accompanying drawings.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application.

Figure 2:
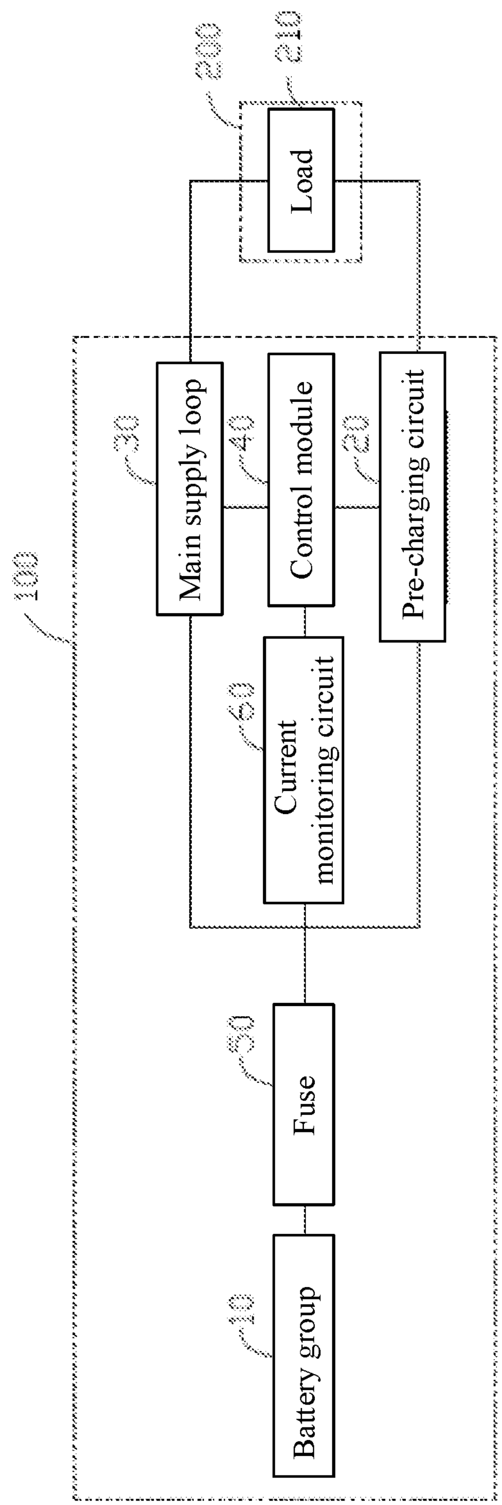
FIG. 2 is a schematic diagram of an electrochemical apparatus according to another embodiment of this application.

Referring to FIG. 1 and FIG. 2, an embodiment of this application provides an electrochemical apparatus 100. The electrochemical apparatus 100 is electrically connected to an electrical apparatus 200 to supply electricity to the electrical apparatus 200. It can be understood that the electrochemical apparatus 100 in the embodiment of this application may be a battery apparatus, and the electrical apparatus 200 may be an electric vehicle.

Specifically, in the embodiment of this application, the electrochemical apparatus 100 includes a battery group 10, a pre-charging circuit 20, a main supply loop 30, and a control module 40.

An output terminal of the battery group 10 is electrically connected to an input terminal of a fuse 50, an output terminal of the fuse 50 is electrically connected to an input terminal of the main supply loop 30, and an output terminal of the main supply loop 30 is electrically connected to the electrical apparatus 200.

An input terminal of the pre-charging circuit 20 is electrically connected to the output terminal of the battery group 10, and an output terminal of the pre-charging circuit 20 is electrically connected to the electrical apparatus 200.

The control module 40 is electrically connected to the pre-charging circuit 20 and the main supply loop 30, to control the main supply loop 30 and the pre-charging circuit 20 to turn on and off.

Specifically, in the embodiment of this application, the pre-charging circuit 20 includes a first switch Q1, and the first switch Q1 is connected in series to the control module 40 and the main supply loop 30. The pre-charging circuit 20 further includes a thermo-sensitive element F1 connected to the first switch Q1 in series.

The control module 40 is configured to control the first switch Q1 to close to turn on the pre-charging circuit 20, so as to pre-charge the electrical apparatus 200 through the pre-charging circuit 20. After the electrical apparatus 200 is pre-charged to meet a preset condition, the control module 40 controls the first switch Q1 to open to turn off the pre-charging circuit 20, so as to supply power to the electrical apparatus 200 through the main supply loop 30.

In the embodiment of this application, the input terminal of the electrical apparatus 200 may be provided with a load 210. The output terminal of the main supply loop 30 is electrically connected to an input terminal of the load 210, and the output terminal of the pre-charging circuit 20 is electrically connected to the input terminal of the load 210. Specifically, after the load 210 is pre-charged for a preset duration, the control module 40 controls the first switch Q1 to open to turn off the pre-charging circuit 20. When a pre-charged current value of the load 210 is greater than a preset current value, the control module 40 controls the first switch Q1 to open to turn off the pre-charging circuit 20.

In the embodiment of this application, the electrochemical apparatus 100 may further include a current monitoring circuit 60. The current monitoring circuit 60 is electrically connected to the pre-charging circuit 20 and the control module 40. The current monitoring circuit 60 is configured to monitor a pre-charging current of the pre-charging circuit 20, and feed back a monitored pre-charging current to the control module 40 in real time. In this way, the control module 40 can control the pre-charging circuit 20 and the main supply loop 30 based on the pre-charging current fed back by the current monitoring circuit 60.

Specifically, when the pre-charging current value is greater than a preset current value, the control module 40 controls the first switch Q1 to open, so as to turn off the pre-charging circuit 20. For example, when an exception such as a short circuit occurs in the electrical apparatus 200, a pre-charging current of the pre-charging circuit 20 is greater than the preset current value. In this case, the control module 40 may output a control signal to the first switch Q1, so as to open the first switch to turn off the pre-charging circuit 20.

Figure 3:
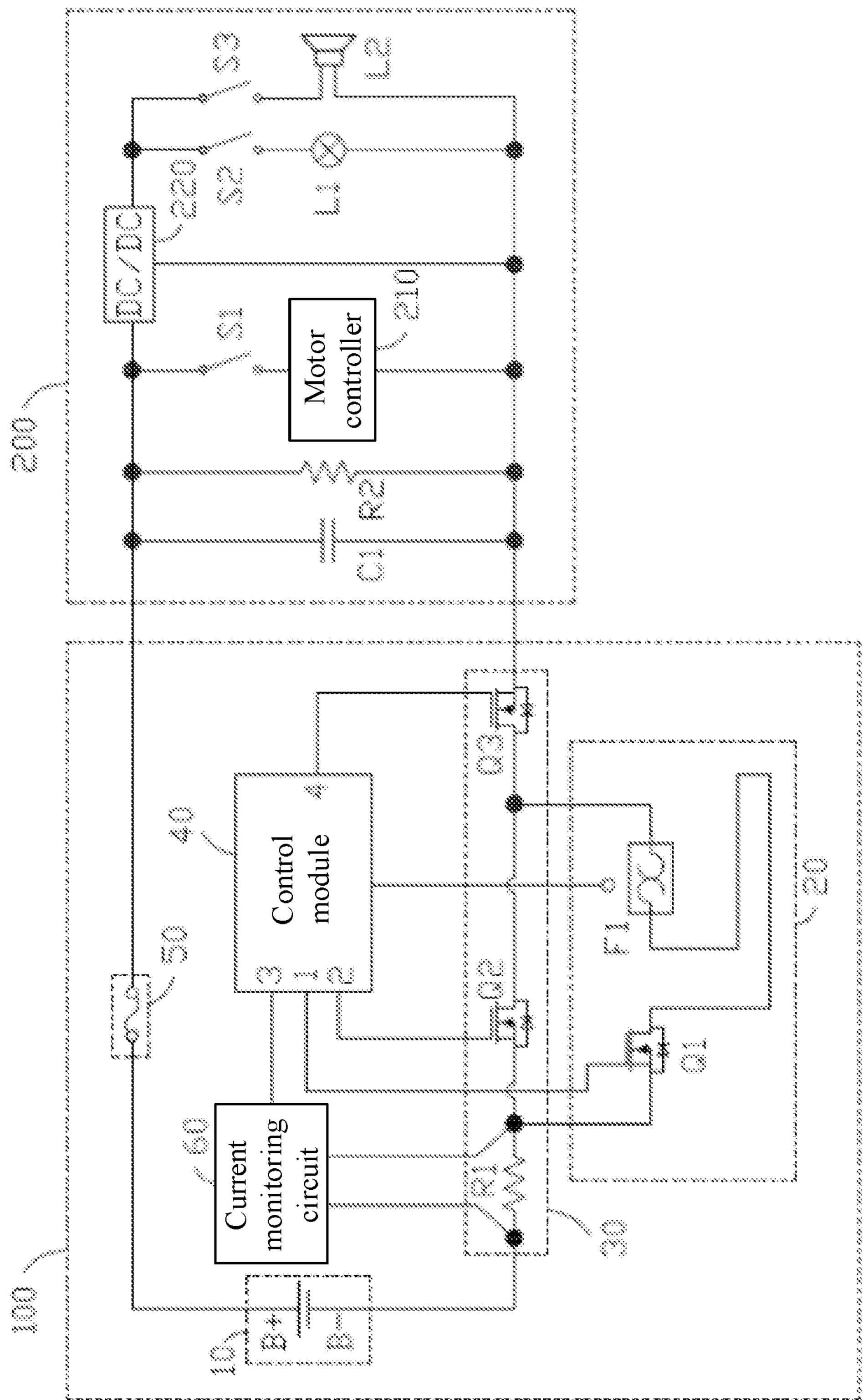
FIG. 3 is a circuit diagram of a first embodiment of an electrochemical apparatus according to this application.

FIG. 3 is a circuit diagram of a first embodiment of connecting the electrochemical apparatus 100 and the electrical apparatus 200 according to this application.

In the embodiment of this application, the pre-charging circuit 20 includes a first switch Q1 and a thermo-sensitive element F1. The main supply loop 30 includes a second switch Q2, a third switch Q3, and a first resistor R1.

A first terminal of the first switch Q1 is electrically connected to a first pin 1 of the control module 40, a second terminal of the first switch Q1 is electrically connected to a first terminal of the thermo-sensitive element F1, a third terminal of the first switch Q1 is electrically connected to the current monitoring circuit 60 and a second terminal of the first resistor R1, a first terminal of the first resistor R1 is electrically connected to a negative electrode B− of the battery group 10, a positive electrode B+ of the battery group 10 is electrically connected to an input terminal of the fuse 50, and an output terminal of the fuse 50 is electrically connected to an input terminal of the load 210 and an input terminal of the main supply loop 30.

The current monitoring circuit 60 is electrically connected to the first terminal and the second terminal of the first resistor R1. The current monitoring circuit 60 is also electrically connected to a third pin 3 of the control module 40, so that the current monitoring circuit can obtain a pre-charging current of the pre-charging circuit by monitoring a voltage across two ends of the first resistor R1, and feed back the obtained pre-charging current to the control module 40.

A first terminal of the second switch Q2 is electrically connected to a second pin 2 of the control module 40, a second terminal of the second switch Q2 is electrically connected to a second terminal of the third switch Q3, a third terminal of the second switch Q2 is electrically connected to the third terminal of the first switch Q1 and the second terminal of the first resistor R1, a first terminal of the third switch Q3 is electrically connected to a fourth pin 4 of the control module, and a third terminal of the third switch Q3 is electrically connected to a terminal of the load 210.

The electrical apparatus 200 includes an electrode controller, a voltage conversion module 220, a fourth switch S1, a fifth switch S2, a sixth switch S3, a first capacitor C1, a second resistor R2, a first power element L1, and a second power element L2.

A first terminal of the first capacitor C1, a first terminal of the second resistor R2, and a first terminal of the fourth switch S1 are all electrically connected to the output terminal of the fuse 50, the voltage conversion module 220 is electrically connected between the first terminal of the fourth switch S1 and a first terminal of the fifth switch S2, and the voltage conversion module 220 is electrically connected to the third terminal of the third switch Q3. A second terminal of the first capacitor C1, a second terminal of the second resistor R2, and a second terminal of a motor controller are electrically connected to the third terminal of the third switch Q3, a second terminal of the fourth switch S1 is electrically connected to a first terminal of the motor controller, the first power element L1 is electrically connected between a second terminal of the fifth switch S2 and the third terminal of the third switch Q3, the sixth switch S3 is electrically connected between a first terminal of the second power element L2 and the voltage conversion module 220, and a second terminal of the second power element L2 is electrically connected to the third terminal of the third switch Q3.

In the embodiment of this application, the first switch Q1, the second switch Q2, and the third switch Q3 may all be N-type field-effect transistors. The first terminals of the first switch Q1, the second switch Q2, and the third switch Q3 all correspond to gates of the N-type field-effect transistors, the second terminals of the first switch Q1, the second switch Q2, and the third switch Q3 correspond to drains of the N-type field-effect transistors, and the third terminals of the first switch Q1, the second switch Q2, and the third switch Q3 correspond to sources of the N-type field-effect transistors.

In the embodiment of this application, the thermo-sensitive element F1 is a ceramic positive temperature coefficient ceramic positive temperature coefficient (CPTC) thermistor device. That is, impedance of the CPTC device may increase with a rise in temperature.

Figure 4:
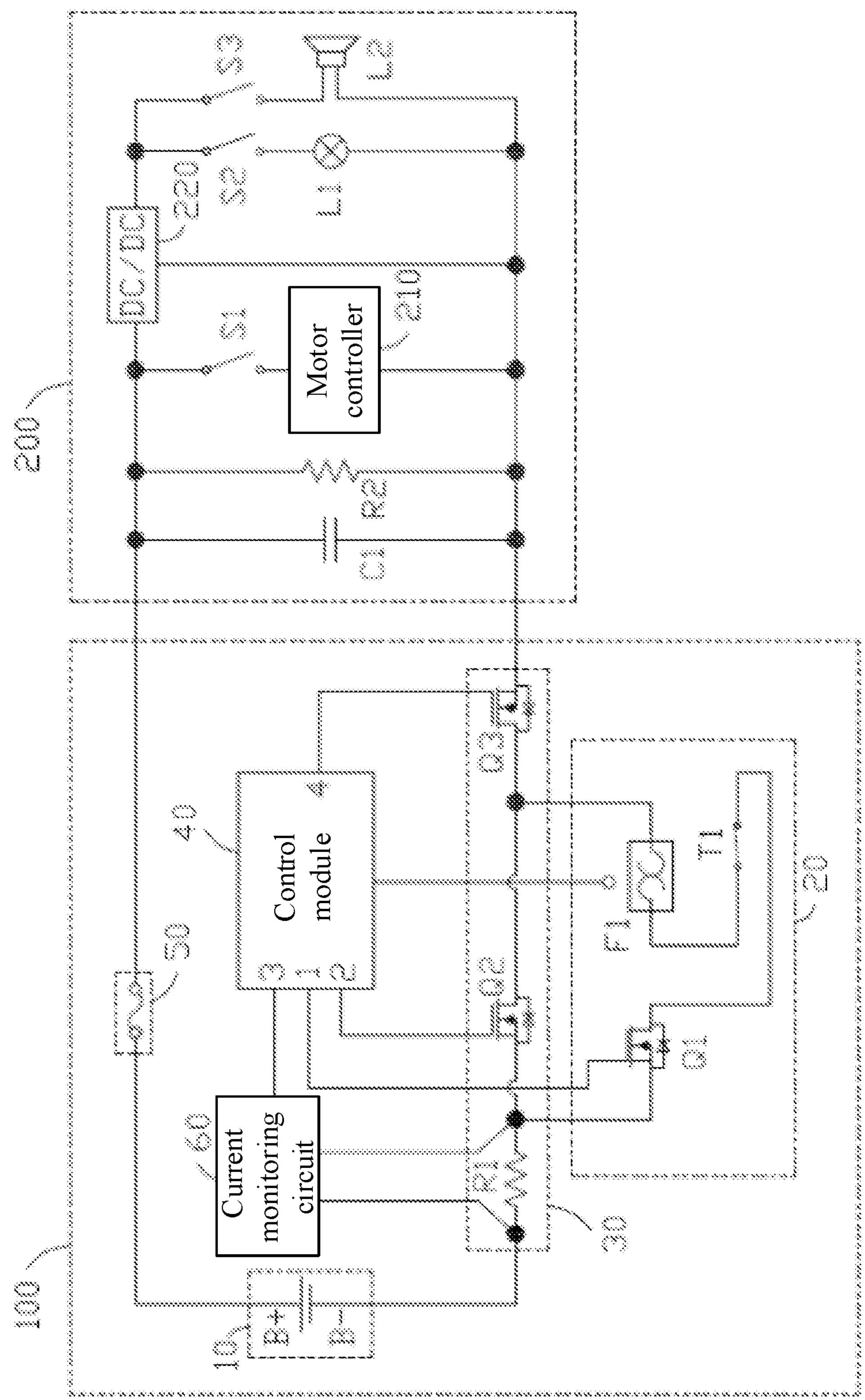
FIG. 4 is a circuit diagram of a second embodiment of an electrochemical apparatus according to this application.

FIG. 4 is a circuit diagram of a second embodiment of connecting the electrochemical apparatus 100 and the electrical apparatus 200 according to this application.

A difference between the electrochemical apparatus 100 in the second embodiment of this application and the electrochemical apparatus 100 in the first embodiment is as follows:

The pre-charging circuit 20 in the second embodiment of this application further includes a temperature control switch T1. The temperature control switch T1 in this embodiment is electrically connected between the second terminal of the first switch Q1 and the thermo-sensitive element F1.

The temperature control switch T1 is disposed close to the thermo-sensitive element F1. The temperature control switch T1 is configured to sense a temperature of the thermo-sensitive element F1, and turn off the pre-charging circuit 20 when the temperature of the thermo-sensitive element F1 is greater than a preset temperature value.

In the following, the circuit shown in FIG. 4 is used to describe a working principle of the electrical apparatus 200 of this application.

During use, when the control module 40 is powered on, a first signal is output from the first pin 1 of the control module 40 to the first switch Q1 to turn on the first switch. Both the second switch Q2 and the third switch Q3 are off at this time, that is, the pre-charging circuit 20 starts to pre-charge the load in the electrical apparatus. After the load is pre-charged for a specific period of time, the control module 40 controls the main supply loop to supply power to the electrical apparatus 200 by controlling states of the second switch Q2 and the third switch.

During the pre-charging, when an exception (such as a short circuit) occurs in the electrical apparatus 200, the current monitoring circuit 60 detects a pre-charging current exceeding a current threshold, and a second signal is output from the first pin 1 of the control module 40 to the first switch Q1, so as to open the Q1 to turn off the pre-charging circuit 20, thereby ending pre-charging actions. However, if the first switch Q1 fails, that is, the first switch Q1 cannot be opened, a combination of the thermo-sensitive element F1 and the temperature control switch T1 can prevent consequences caused by the failure of the first switch. To be specific, in this case, the temperature of the thermo-sensitive element F1 may rise due to its impedance characteristics, and when the temperature rises to a Curie temperature point, the impedance of the thermo-sensitive element F1 increases. According to Ohm's Law, a loop current will be limited. However, in this case, the thermo-sensitive element cannot completely cut off the pre-charging current, and the temperature control switch T1 senses the temperature of the thermo-sensitive element F1 in real time. When the temperature of the thermo-sensitive element F1 is greater than a preset temperature value, that is, the temperature of the thermo-sensitive element F1 reaches a Curie temperature point, the temperature control switch T1 will be opened, then the pre-charging circuit 20 is turned off, and the pre-charging actions end.

Therefore, the technical solutions of this application have advantages such as low power consumption cost and high reliability, can prevent safety problems such as burning and explosion of a battery due to heating up of a pre-discharging resistor, and can also improve user experience.

The thermo-sensitive element in overcurrent is automatically changed to a high resistance state, and can be restored to its original impedance when the overcurrent state is removed and the body temperature is dropped. Due to this characteristic, when a constant pre-charging current is required from outside, the impedance of the thermo-sensitive element may be selected to match the power, ensuring a capability to supply power to the outside while protecting against a short-circuit state of an external load. Compared to a conventional pre-charging circuit with an equivalent power, the technical solutions of this application require small installation space and have high integration.

Figure 5:
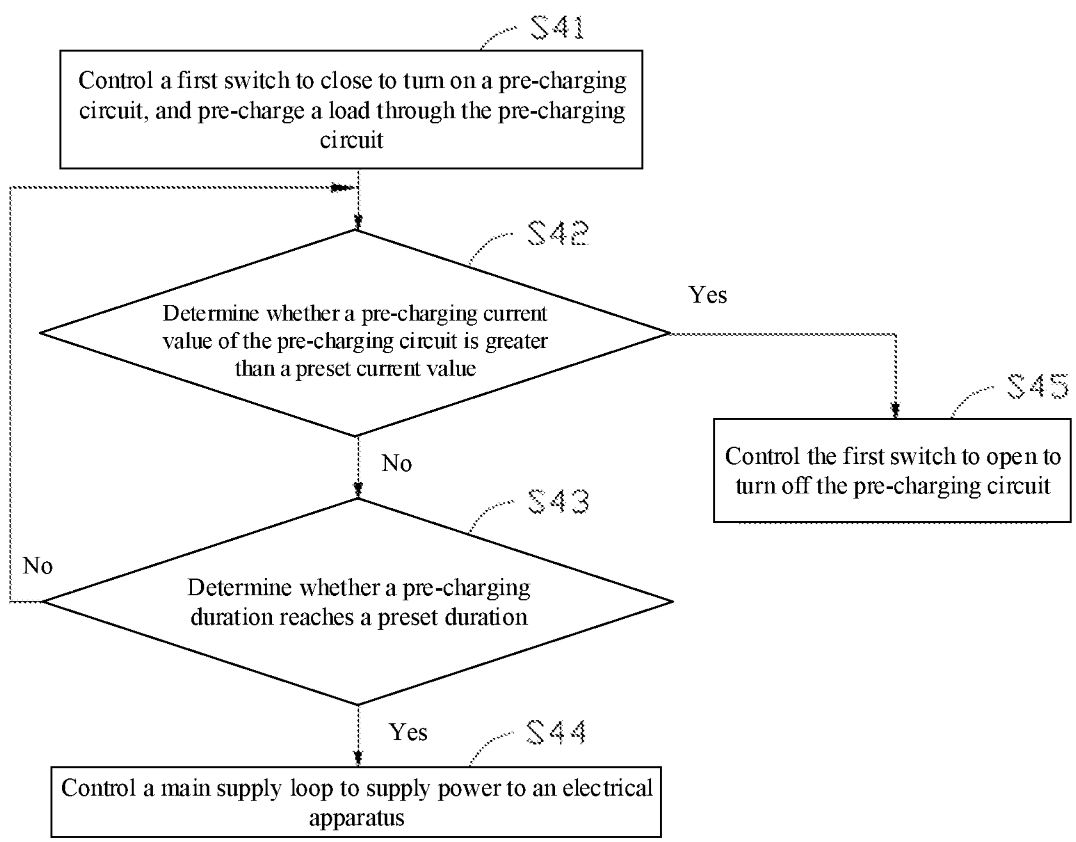
FIG. 5 is a flowchart of a first embodiment of a power supply control method according to this application.

FIG. 5 is a flowchart of a power supply control method of this application. The flowchart of the power supply control method includes the following steps.

Step S41. Control a first switch to close to turn on a pre-charging circuit, and pre-charge an electrical apparatus through the pre-charging circuit.

Step S42. Determine whether a pre-charging current value of the pre-charging circuit is greater than a preset current value. If yes, proceed to step S45; otherwise, proceed to step S43.

When a pre-charging current value of the pre-charging circuit is less than or equal to the pre-preset current value, the pre-charging circuit can pre-charge the electrical apparatus normally.

Step S43. Determine whether a pre-charging duration reaches a preset duration. If yes, proceed to step S44; otherwise, return to step S42.

Step S44. Control states of a second switch and a third switch in a main supply loop to control the main supply loop to supply power to the electrical apparatus.

When a duration for which to pre-charge the electrical apparatus reaches the preset duration, pre-charging actions of the electrical apparatus have been completed.

Step S45. Control the first switch to open to turn off the pre-charging circuit.

When a pre-charging current of the pre-charging circuit is greater than the pre-preset current, an exception occurs in the electrical apparatus. In this case, the first switch is controlled to be opened to turn off the pre-charging circuit, and then the pre-charging ends.

Therefore, according to the power supply control method of the electrochemical apparatus of this application, charging an element with a small current can be performed in advance before a normal power supply, preventing from damaging the battery and other elements by a transient short circuit caused by a capacitor in direct charging.

Figure 6:
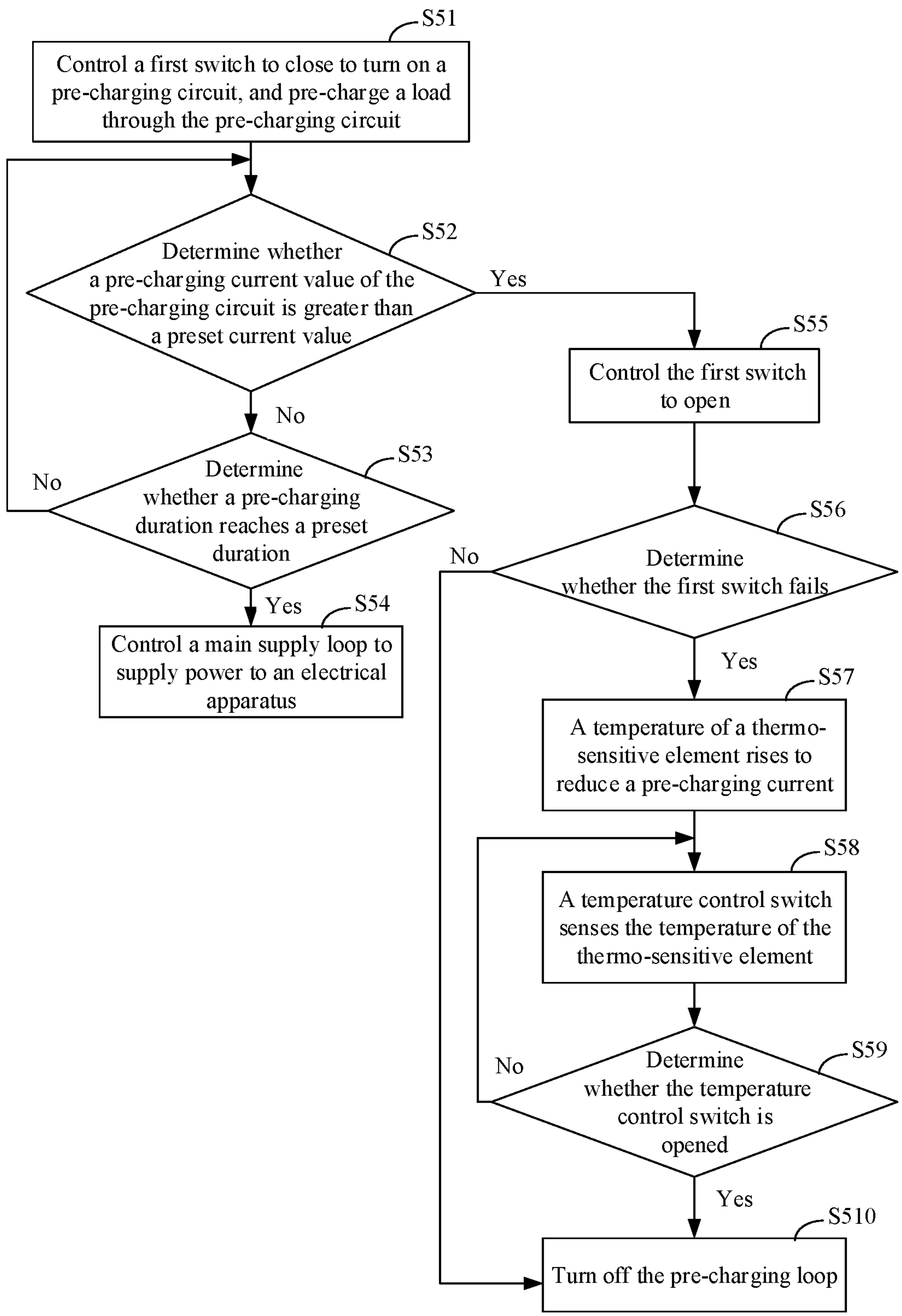
FIG. 6 is a flowchart of a second embodiment of a power supply control method according to this application.

FIG. 6 is a flowchart of a power supply control method of another electrochemical apparatus shown according to an example embodiment. A difference from the method shown in FIG. 5 lies in that the method shown in FIG. 6 further provides a power supply method for the case where the first switch fails. The power supply control method shown in FIG. 6 may include the following steps.

Step S51. Control a first switch to close to turn on a pre-charging circuit, and pre-charge an electrical apparatus through the pre-charging circuit.

Step S52. Determine whether a pre-charging current value of the pre-charging circuit is greater than a preset current value. If yes, proceed to step S55; otherwise, proceed to step S53.

Step S53. Determine whether a pre-charging duration reaches a preset duration. If yes, proceed to step S54; otherwise, return to step S52.

Step S54. Control states of a second switch and a third switch in a main supply loop to control the main supply loop to supply power to the electrical apparatus.

Step S55. Control the first switch to open.

In the embodiment of this application, when an exception occurs in the electrical apparatus, that is, the pre-charging current value is greater than a preset current value, the control module outputs a signal to the first switch to control the first switch to open.

Step S56. Determine whether the first switch fails. If the first switch has failed, proceed to step S57; otherwise, proceed to step S510.

Step S57. A temperature of a thermo-sensitive element rises to limit the pre-charging current.

Step S58. A temperature control switch senses the temperature of the thermo-sensitive element in real time.

Step S59. Determine whether the temperature control switch is opened. If yes, proceed to step S510; otherwise, return to step S58.

In the embodiment of this application, when the temperature of the thermo-sensitive element is greater than a preset temperature value, that is, the temperature value of the thermo-sensitive element reaches a Curie temperature point, the temperature control switch is automatically opened. When the temperature of the thermo-sensitive element is lower than the preset temperature value, the temperature control switch is not opened, that is, the temperature control switch will continue to sense the temperature of the thermo-sensitive element.

Step S510. When the temperature switch is opened, turn off the pre-charging loop to end pre-charging actions.

A pre-charging circuit and a main supply loop based on a thermo-sensitive element are used in place of a pre-charging circuit with high power and pre-charging resistance. This achieves miniaturization of a BMS, implements pre-charging and low power supply functions, and prevents problems of battery burning and explosion that might be caused by heating up of a pre-discharging resistor.

Persons of ordinary skills in the art should recognize that the foregoing embodiments are only intended to illustrate this application, but are not intended to limit this application, and appropriate changes and modifications made to the foregoing embodiments without departing from the substantial spirit and scope of this application shall fall within the claimed scope of this application.

What is claimed is:

1. An electrochemical apparatus, configured to supply electricity to an electrical apparatus, wherein the electrochemical apparatus comprises a battery group, a main supply circuit, a pre-charging circuit, and a control module; wherein the main supply circuit is electrically connected to the battery group;

the pre-charging circuit comprises a first switch and a thermo-sensitive element, the thermo-sensitive element is configured to electrically connect the first switch, and impedance of the thermo-sensitive element increases with a rise in temperature;

the first switch is electrically connected to the control module and the main supply circuit;

the control module is configured to control the main supply circuit to turn off, and the control module is further configured to control the first switch to close to turn on the pre-charging circuit; and when the pre-charging circuit meets a preset condition, the control module controls the first switch to open to turn off the pre-charging circuit, wherein the pre-charging circuit further comprises a temperature control switch, wherein the temperature control switch is connected between the thermo-sensitive element and the first switch, and the temperature control switch is configured to be opened when the temperature control switch detects that the temperature of the thermo-sensitive element is greater than a preset threshold.

2. The electrochemical apparatus according to claim 1, wherein the preset condition comprises that a pre-charging current value is greater than a preset threshold.

3. The electrochemical apparatus according to claim 2, wherein when the first switch fails, a temperature of the thermo-sensitive element continues to rise and the impedance of the thermo-sensitive element increases, and the thermo-sensitive element is configured to limit a pre-charging current.

4. The electrochemical apparatus according to claim 3, wherein when the pre-charging circuit does not meet a preset condition, the control module controls the main supply circuit to turn on.

5. The electrochemical apparatus according to claim 1, wherein the preset condition comprises a pre-charging duration is greater than a preset duration.

6. The electrochemical apparatus according to claim 1, further comprising a current monitoring circuit, wherein the current monitoring circuit is electrically connected to the pre-charging circuit and the control module to monitor the pre-charging current of the pre-charging circuit, and feed back a monitored pre-charging current value to the control module.

7. The electrochemical apparatus according to claim 6, wherein the temperature control switch is disposed close to the thermo-sensitive element and configured to sense the temperature of the thermo-sensitive element.

8. The electrochemical apparatus according to claim 7, wherein a first terminal of the first switch is electrically connected to the control module, a second terminal of the first switch is electrically connected to the temperature control switch, and a third terminal of the first switch is electrically connected to the current monitoring circuit.

9. The electrochemical apparatus according to claim 8, wherein the main supply circuit comprises a second switch and a third switch, wherein a first terminal of the second switch is electrically connected to the control module, a second terminal of the second switch is electrically connected to a second terminal of the third switch, a third terminal of the second switch is electrically connected to a third terminal of the first switch, a first terminal of the third switch is electrically connected to the control module, and a third terminal of the third switch is electrically connected to a terminal of a load.

10. The electrochemical apparatus according to claim 1, wherein the main supply circuit further comprises a fuse, wherein a first terminal of the fuse is electrically connected to a positive electrode of the battery group, and a second terminal of the fuse is electrically connected to an input terminal of the main supply circuit.

11. The electrochemical apparatus according to claim 1, wherein the thermo-sensitive element is connected to the first switch in series.

12. The electrochemical apparatus according to claim 1, wherein the electrochemical apparatus is a battery pack.

13. An electrical apparatus, wherein the electrical apparatus is electrically connected to the electrochemical apparatus according to claim 1, and the electrochemical apparatus is configured to supply electricity to the electrical apparatus.

14. The electrical apparatus according to claim 13, wherein the electrical apparatus is provided with a load, and an output terminal of the pre-charging circuit is electrically connected to an input terminal of the load.

15. An electric vehicle, wherein the electric vehicle is electrically connected to the electrochemical apparatus according to claim 1, and the electrochemical apparatus is configured to supply electricity to the electric vehicle.

16. An electrochemical apparatus, configured to supply electricity to an electrical apparatus, wherein the electrochemical apparatus comprises a battery group, a main supply circuit, a pre-charging circuit, and a control module; wherein the main supply circuit is electrically connected to the battery group, the pre-charging circuit comprises a first switch and a thermo-sensitive element, the thermo-sensitive element is configured to electrically connect the first switch, and impedance of the thermo-sensitive element increases with a rise in temperature; and the first switch is electrically connected to the control module and the main supply circuit, and the thermo-sensitive element is electrically connected to the first switch, wherein the pre-charging circuit further comprises a temperature control switch, wherein the temperature control switch is connected between the thermo-sensitive element and the first switch, and the temperature control switch is opened when the temperature control switch detects that the temperature of the thermo-sensitive element is greater than a preset threshold.

17. The electrochemical apparatus according to claim 16, wherein the thermo-sensitive element is a ceramic positive temperature coefficient thermistor device.

18. The electrochemical apparatus according to claim 16, wherein the thermo-sensitive element is connected to the first switch in series.

19. An electrical apparatus, wherein the electrical apparatus is electrically connected to the electrochemical apparatus according to claim 16, and the electrochemical apparatus is configured to supply electricity to the electrical apparatus.

20. The electrical apparatus according to claim 19, wherein the electrical apparatus is provided with a load, and the output terminal of the pre-charging circuit is electrically connected to an input terminal of the load.

21. An electric vehicle, wherein the electric vehicle is electrically connected to the electrochemical apparatus according to claim 16, and the electrochemical apparatus is configured to supply electricity to the electric vehicle.

22. A power supply control method for an electrochemical apparatus, comprising:

controlling a first switch to close to turn on a pre-charging circuit comprising a thermo-sensitive element and a temperature control switch, and pre-charging an electrical apparatus through the pre-charging circuit, wherein the thermo-sensitive element is configured to electrically connect the first switch, and impedance of the thermo-sensitive element increases with a rise in temperature, and wherein the temperature control switch is connected between the thermo-sensitive element and the first switch;

when the pre-charging circuit meets a preset condition, controlling the first switch to open to turn off the pre-charging circuit; and when the temperature control switch detects that the temperature of the thermo-sensitive element is greater than a preset threshold, controlling the temperature control switch to open.

23. The power supply control method for an electrochemical apparatus according to claim 22, wherein the preset condition comprises that a pre-charging current value is greater than a preset threshold.

24. The power supply control method for an electrochemical apparatus according to claim 22, wherein the preset condition comprises that a pre-charging duration is greater than a preset duration.

25. The power supply control method for an electrochemical apparatus according to claim 24, further comprising:

when the pre-charging circuit meets the preset condition, controlling a main supply circuit to remain in an off state.

26. The power supply control method for an electrochemical apparatus according to claim 24, further comprising:

when the pre-charging circuit does not meet the preset condition, controlling a main supply circuit to remain in an on state.

27. The power supply control method for an electrochemical apparatus according to claim 26, further comprising:

when the pre-charging circuit does not meet the preset condition, controlling the first switch to open.

28. The power supply control method for an electrochemical apparatus according to claim 26, further comprising:

when the pre-charging circuit does not meet the preset condition, controlling the first switch to close.

29. The power supply control method for an electrochemical apparatus according to claim 22, wherein, when the first switch fails, the temperature of the thermo-sensitive element continues to rise and the impedance of the thermo-sensitive element increases, to limit a pre-charging current.

30. The power supply control method for an electrochemical apparatus according to claim 22, further comprising:

if the temperature of the thermo-sensitive element continues to rise and the impedance of the thermo-sensitive element increases, determining that the first switch has failed.

* * * * *